United States Patent
Zhang et al.

(10) Patent No.: US 9,204,508 B2
(45) Date of Patent: Dec. 1, 2015

(54) LED DECORATIVE LIGHT

(75) Inventors: Guoguang Zhang, Taizhou (CN); Xiuhong Zhang, Taizhou (CN)

(73) Assignees: Xiuhong Zhang (CN); Feng Qu (CN)

( * ) Notice: Subject to any disclaimer, the term of this patent is extended or adjusted under 35 U.S.C. 154(b) by 818 days.

(21) Appl. No.: 13/478,186

(22) Filed: May 23, 2012

(65) Prior Publication Data

US 2012/0299488 A1    Nov. 29, 2012

(30) Foreign Application Priority Data

May 25, 2011 (CN) .................. 2011 2 0169207 U
Sep. 16, 2011 (CN) .................. 2011 2 0347246 U

(51) Int. Cl.
*H05B 37/02* (2006.01)
*H05B 33/08* (2006.01)

(52) U.S. Cl.
CPC ........ *H05B 33/0818* (2013.01); *H05B 33/0842* (2013.01); *Y02B 20/346* (2013.01)

(58) Field of Classification Search
CPC ........... H05B 33/0818; H05B 33/0842; H05B 39/047; H05B 37/00; H05B 37/02; H05B 41/3927; H05B 41/3925; Y02B 20/346
USPC ...... 315/186, 291, 185 R, 185 S, 209 R, 297, 315/300, 307
See application file for complete search history.

(56) References Cited

U.S. PATENT DOCUMENTS

| | | | |
|---|---|---|---|
| 2004/0130442 A1* | 7/2004 | Breed et al. ................... | 340/443 |
| 2005/0248552 A1* | 11/2005 | Yu ................................ | 345/204 |
| 2007/0159008 A1* | 7/2007 | Bayat et al. ................... | 307/112 |
| 2007/0188427 A1* | 8/2007 | Lys et al. ........................ | 345/82 |
| 2010/0264849 A1* | 10/2010 | Bolzan .......................... | 315/309 |
| 2010/0327766 A1* | 12/2010 | Recker et al. ................. | 315/291 |
| 2011/0193411 A1* | 8/2011 | Lam et al. ...................... | 307/35 |
| 2011/0291585 A1* | 12/2011 | Foo ............................... | 315/291 |

FOREIGN PATENT DOCUMENTS

| | | |
|---|---|---|
| CN | 2694698 | 4/2005 |
| CN | 201238409 | 5/2009 |

* cited by examiner

*Primary Examiner* — Tuyet Vo
*Assistant Examiner* — Henry Luong
(74) *Attorney, Agent, or Firm* — Schmeiser, Olsen & Watts, LLP

(57) ABSTRACT

LED decorative light comprising DC power supply, main controller, and LED light chains; said main controller consists of key switch, crystal oscillating access circuit, and main control chip, with said key switch and crystal oscillating access circuit connected to said main control chip respectively; said main control chip pulse width modulation end outputs variable duty ratio PWM; said crystal oscillating circuit is used to provide instruction cycle required for main control chip; and said key switch is used to control operating state of main control chip; wherein said main controller also includes a voltage adjustment circuit, used to adjust DC power supply voltage to the value required for LED light chains, with input end of this circuit connected to said DC power supply, its control end connected to pulse width modulation end of said main control chip, and its output end connected to LED light chain input end.

9 Claims, 9 Drawing Sheets

100

LED DECORATIVE LIGHT

FIELD OF TECHNOLOGY

The following relates to a type of light fixture, in particular a type of LED decorative light powered by batteries.

BACKGROUND

Holiday light fixture increases the festivity of holidays and its illumination is generally controlled by controller.

Chinese utility model of publication No. CN20128409 discloses a light control box for controlling the status of LED lighting chains, comprising front cover, rear cover and printed circuit board placed between the front and rear covers. The rear cover is provided with a space for holding batteries and a battery cover for blocking the batteries. The front cover is provided with a plurality of button holes in which buttons are placed. When a button is pressed, the PCB circuit is triggered to switch over the status of LED lighting chains. Using this utility model, light control is very convenient. However, the quantity of lighting chains connected to the controller is limited and batteries need to be changed frequently.

Chinese utility model of publication No. CN2694698 discloses an intelligent electronic controller for light fixture, comprising power circuit, control circuit and output circuit, wherein said control circuit includes a main control chip, main control chip power supply circuit comprising capacitor and resistor, and crystal oscillating circuit comprising capacitor and crystal oscillator or RC oscillating circuit comprising capacitor and resistor, all electrically connected to the main control chip. Since in this utility model, main control chip is used as core control element of control circuit, different programs are inputted to realize different functions, so that operating mode of light fixture can be set discretionally, greatly satisfying market demand and higher appreciation demand of clients to light products. The regulating circuit electrically connected to the main control chip can enable functional selection or regulation of bulb flashing speed and thus realize multifunctional switching of bulbs. However, this electronic light controller is connected to the grid via power supply circuit, which needs complicated circuit structure and might have adverse effect on the grid due to frequent starting of bulbs.

SUMMARY

To overcome the above deficiencies, battery-booster-powered light fixtures may be provided, and its controller can be connected to more lighting chains, with good luminous effect.

In another aspect, LED decorative light comprising DC power supply, main controller, and LED light chains; said main controller consists of key switch, crystal oscillating circuit, and main control chip, with said key switch and crystal oscillating circuit connected to said main control chip respectively; said main control chip pulse width modulation end outputs variable duty ratio PWM; said crystal oscillating circuit is used to provide instruction cycle required for main control chip; said key switch is used to control operating state of main control chip; said main controller also includes a voltage adjustment circuit, used to adjust DC power supply voltage to the value required for LED light chains, with input end of this circuit connected to said DC power supply, its control end connected to pulse width modulation end of said main control chip, and its output end connected to LED light chain input end.

As further improvement, said controller is also provided with a flashing control circuit whose input end is connected to I/O port of the main control chip and output end to LED light chains; said main control chip drives LED light chains to flash via the flashing control circuit.

Said flashing control circuit comprises a resistor and a triode. The resistor is connected to base of the triode, forming base driver circuit. Said resistor is connected to I/O port of the main control chip and collector of the triode is connected to LED light chains.

Said crystal oscillating circuit comprises two ceramic disc capacitors connected in parallel and a crystal oscillator connected with these two capacitors.

Said voltage adjustment circuit comprises an inductor, a ceramic disc capacitor, a carbon film resistor, a triode, a diode, and an electrolytic capacitor that are electrically connected.

As further improvement, said main controller is provided with a sampling circuit. Said sampling circuit is connected to LED light chains control circuit output end and said main control chip samples output voltage of the sampling circuit via the IO port in real-time. When sampled voltage is lower than a set output value, the main control chip adjusts duty ratio of PWM to increase output voltage of LED light chains control circuit, so that LED light chains can maintain original viewing effect, battery voltage can be made full use of, and energy saving and environmental protection can be realized.

As further improvement, said main control chip is also used to make the pulse width modulation end to output pulse of 0 duty ratio and duty ratio pulse that lights up LED light chains at an interval less than the visual persistence time of LED light in the human eyes. Due to the visual persistence phenomenon of normal human eyes, and visual delay mostly in 0.2-0.4 s, if LED light chains are turned off within this delay and turned on at other time, although LED light chains are off in periods, since these periods are within visual delay, the human eyes cannot differentiate, and the LED light chains seem On all the time. This can be equivalent to intermittent shutdown of power supply. But the voltage is changing very fast at a rate less than visual persistence time of LED light at human eyes, so the eyes cannot notice LED darkened or not luminous, thus saving energy.

As further improvement, said main control chip has built-in timer and frequency divider. Said crystal oscillating circuit sets timer overflow time and the energy saving module of said main control chip controls the light fixture to shut off automatically after 6-hour service every day and to start working again automatically after 18 hours of outage. If 8 LEDs are connected to 3×AA batteries and the main control chip continuously outputs pulse with duty ratio of 0.94, the batteries can supply the entire line for 80 hours approximately. If the main control chip outputs pulse with varying duty ratio, 3×AA batteries can be connected to 240 LEDs and make them work for 60 days (6-hour service each day).

As further improvement, said flashing control circuit comprises a resistor and a triode. The resistor is connected to base of the triode, forming base driver circuit. Said resistor is connected I/O port of the main control chip and collector of the triode is connected to LED light chains.

The key switch has a point contact type structure and a conductive silicon rubber layer is provided on its internal end face. The key switch is used for controlling the main control chip to switch on and off the voltage adjustment circuit: 1) when the voltage adjustment circuit is switched off, the controller input voltage is 1.5~6v and output voltage is equal to input voltage; 2) when the voltage adjustment circuit is switched on, the voltage is boosted to about 30V.

Said key switch is also used to send input signal to the main control chip for selecting flashing mode when the voltage adjustment circuit is switched on. One LED flashing mode is realized each time the switch is pressed.

As further improvement, said main controller is also provided with a wireless receiving circuit connected to the main control chip and used to receive wireless signals from the wireless transmitter, which will then be sent to the main control chip.

Beneficial effects are as follows:

A crystal oscillating circuit is provided in the controller. When the key switch is pressed, this crystal oscillating circuit oscillates, causing the processor chip to send out pulse signals. These signals are processed by the voltage adjustment circuit, so that the controller can be connected to many light chains, further enhancing luminous effect of light chains and fully utilizing batteries in the controller as power supply. For existing light fixture, LEDs darken gradually till not luminous as batteries wear down slowly. However, with the embodiments disclosed herein, since a voltage adjustment circuit is provided, stable change of output voltage can be maintained as long as input voltage exists. Therefore, LED light will not gradually darken with this light fixture, and the same brightness of each LED of the whole light chain can be maintained continuously, till batteries are all exhausted.

BRIEF DESCRIPTION

DETAILED DESCRIPTION

Embodiment 1

Figure 1:
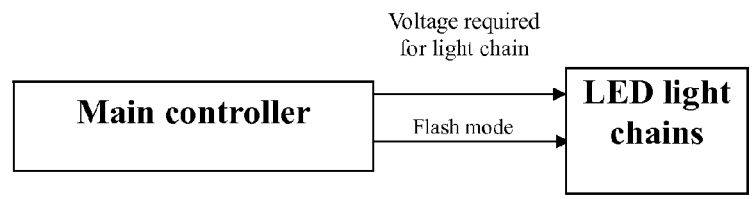
FIG. 1 is structural block diagram of LED decorative light of embodiment 1.

In structural block diagram of LED decorative light shown in FIG. 1, the LED decorative light consists of main controller and LED light chains.

Figure 2:
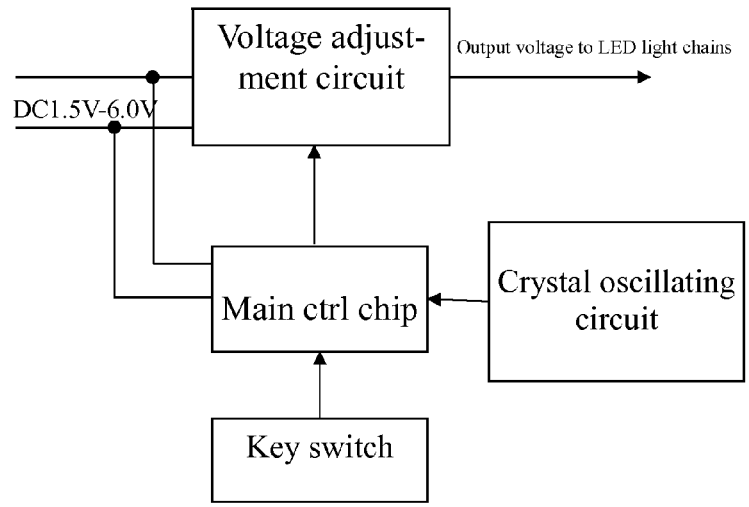
FIG. 2 is structural block diagram of main controller of embodiment 1.

In structural block diagram of main controller shown in FIG. 2, the main controller comprises key switch, crystal oscillating circuit, voltage adjustment circuit, and main control chip. The key switch and the crystal oscillating circuit are connected to main control chip respectively. The pulse width modulation end of the main control chip outputs PWM of variable duty ratio. The crystal oscillating circuit is used to provide instruction cycle required for main control chip. The key switch is used to control operating state of main control chip. The voltage adjustment circuit is used to adjust DC power supply voltage to the value required for LED light chains. Of this circuit, the input end is connected to said DC power supply, the control end is connected to main control chip pulse width modulation end, and the output end is connected to input end of the LED light chains.

Figure 4:
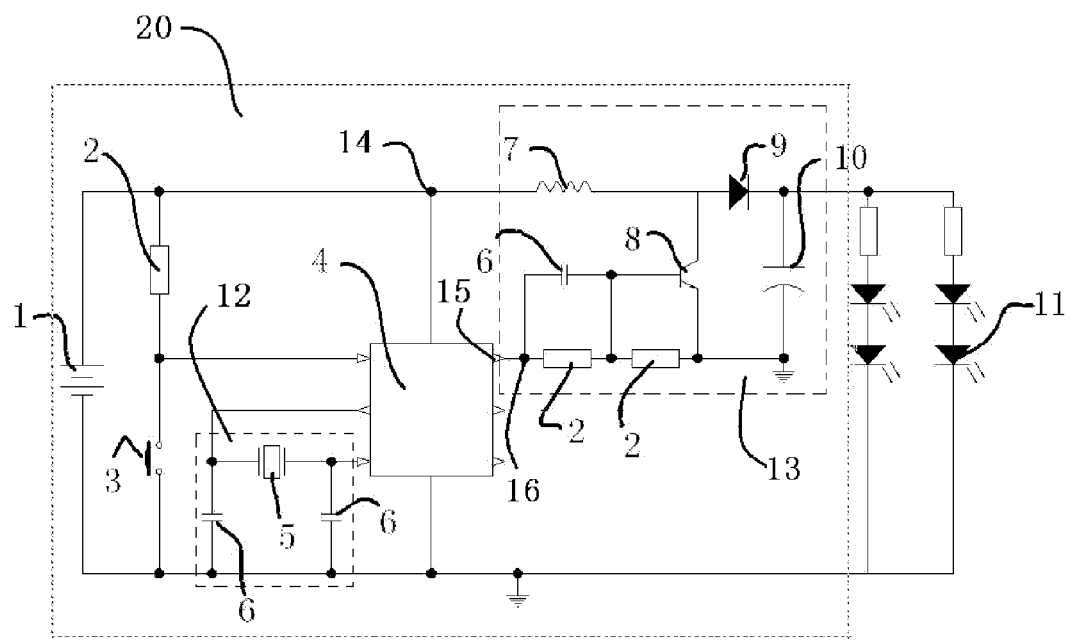
FIG. 4 is circuit diagram of LED decorative light of embodiment 1.

FIG. 4 illustrates particular electric circuit of LED decorative light. As shown in this figure, LED decorative light 100 comprises a main controller 20 and LED light chains 11. Said main controller comprises a DC power supply 1, a key switch 3, a crystal oscillating circuit 12, and a main control chip 4. The main control chip 4 adopts 8-bit SCM. The DC power supply 1, key switch 3, and crystal oscillating circuit 12 are connected separately to the main control chip 4; the crystal oscillating circuit 12 is used to set instruction cycle of the main control chip 4 and the key switch 3 is used to control operating state of main control chip. The controller 20 is also provided with a voltage adjustment circuit 13, of which input end 14 is connected to DC power supply 1, control end is connected to main control chip pulse width modulation end 15, and output end is connected to input end of LED light chains 11, sending pulse signals to the voltage adjustment circuit.

The crystal oscillating circuit 12 comprises a crystal oscillator 5 and two ceramic disc capacitors 6. There two capacitors 6 are connected in parallel and then connected to both ends of the crystal oscillator 5.

The voltage adjustment circuit 13 comprises an inductor 7, a ceramic disc capacitor 6, a carbon film resistor 2, a triode 8, a diode 9, and an electrolytic capacitor 10 that are electrically connected together. One end of the inductor 7 is connected to power supply 1 and the other end to positive pole of the diode 9. The electrolytic capacitor 10 is connected between collector and emitter of the triode 8. Base of the triode 8 is connected to main control chip pulse width modulation end 16 via the ceramic disc capacitor 6 and the carbon film resistor 2. The electrolytic capacitor 10 is connected between negative pole of the diode 9 and emitter of the triode 8. The negative pole of the diode 9 is connected as output end of the voltage adjustment circuit and to LED light chains 11.

When main control chip control triode 8 is conducting, the input voltage flows through the inductor 7. At this time, the diode 9 functions to prevent the capacitor 10 from discharging to the ground. Since the input is direct current, the current in the inductor 7 increases linearly at a certain ratio which is related to the inductance. As the inductor current increases, some energy is store in the inductor. That is to say, the power supply forms a loop via the inductor-triode and the current is converted into magnetic energy and stored in the inductor 7. During this process, the capacitor 10 supplies power to the load.

When main control chip 4 controls cutoff of triode 8, induction electromotive force on the inductor 7 (negative at left and positive at right) makes the diode 9 forward biased and conducting, the inductor 7 releases stored energy and the current decreases slowly. Magnetic energy in the inductor is converted into electric energy on inductor ends (negative on the left and positive on the right). This voltage is superposed onto positive end of the power supply and forms a loop via the diode-load, thus increasing voltage. During this process, energy stored in the inductor 7 and input voltage of towards polarity jointly supply power to the load and charge the capacitor 10.

Figure 15:
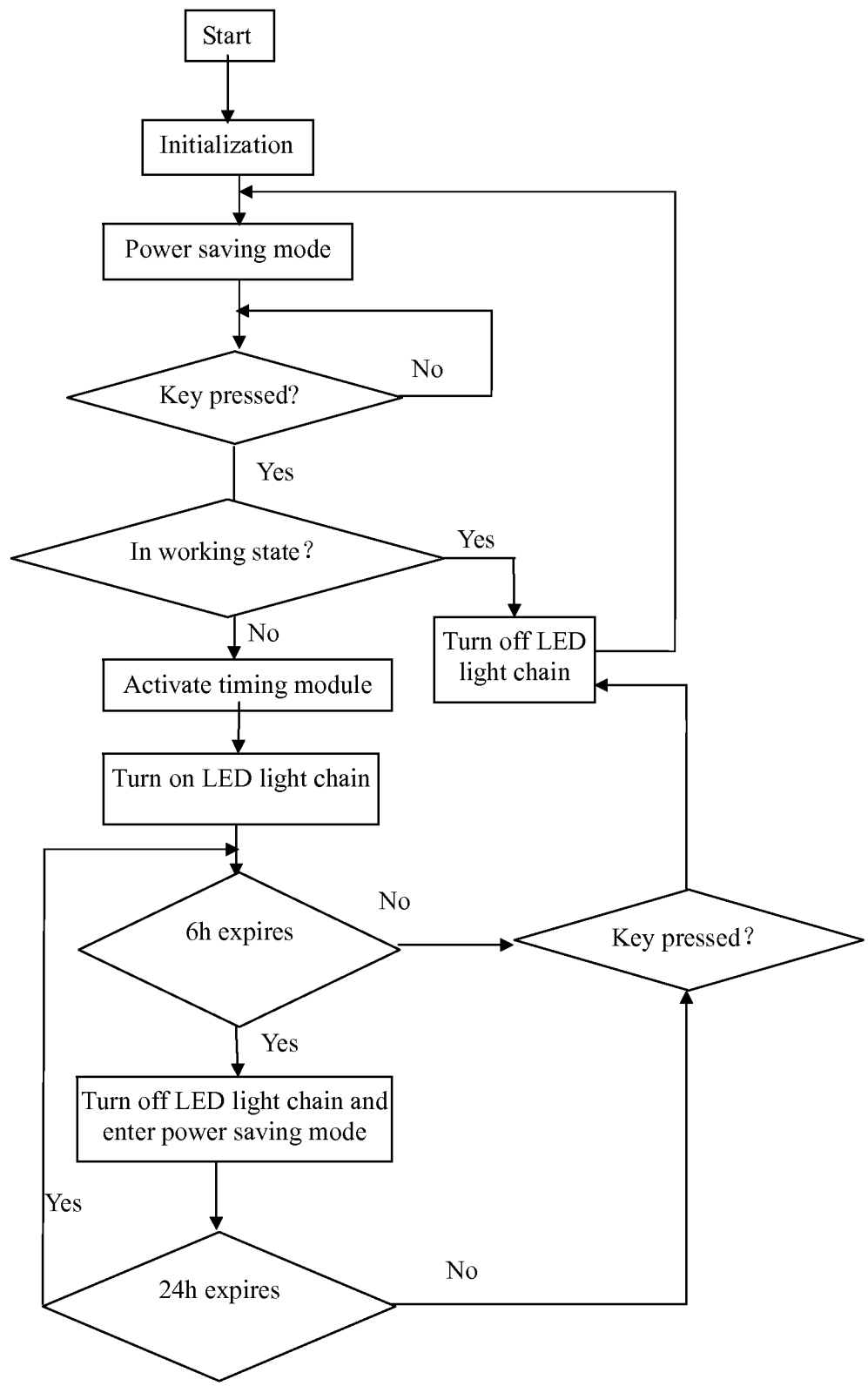
FIG. 15 is power saving control flow diagram of embodiment 2.

The main control chip 4 has built-in timer and frequency divider, and the crystal oscillating circuit 12 sets timer overflow time. The main control chip 4 includes an energy saving control module, which controls the light fixture to shut off automatically after 6-hour service every day and to start working again automatically after 18 hours of outage. Refer to FIG. 15 for the control flow of this module. If 8 LEDs are connected to 3×AA batteries and the main control chip continuously outputs pulse with duty ratio of 0.94, these batteries can supply the entire line for 80 hours approximately. If the main control chip outputs pulse with varying duty ratios, 3×AA batteries can be connected to 240 LEDs and make them work for 60 days (6-hour service each day).

Embodiment 2

Figure 3:
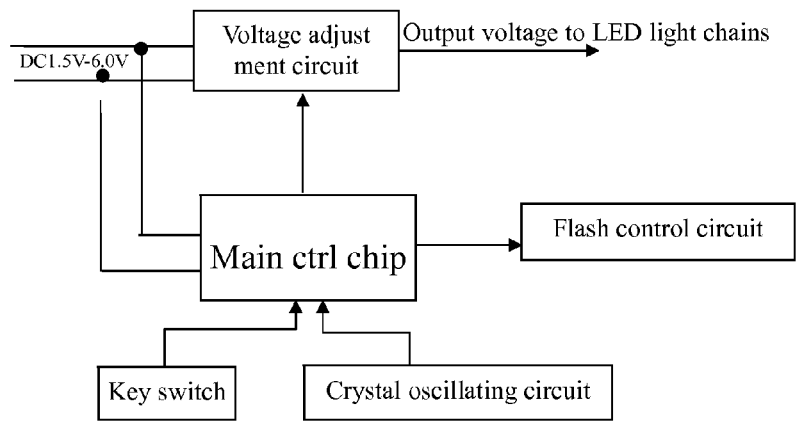
FIG. 3 is structural block diagram of main controller of embodiment 2.

This embodiment is basically similar to the above one, with difference that the controller 20 is also provided with a flashing control circuit 17, as shown in FIG. 3. Input end of the flashing control circuit 17 is connected to I/O port of the main control chip and the output end to LED light chains. I/O port of the main control chip outputs PWM and drives LED to flash via the flashing control circuit.

Figure 5:
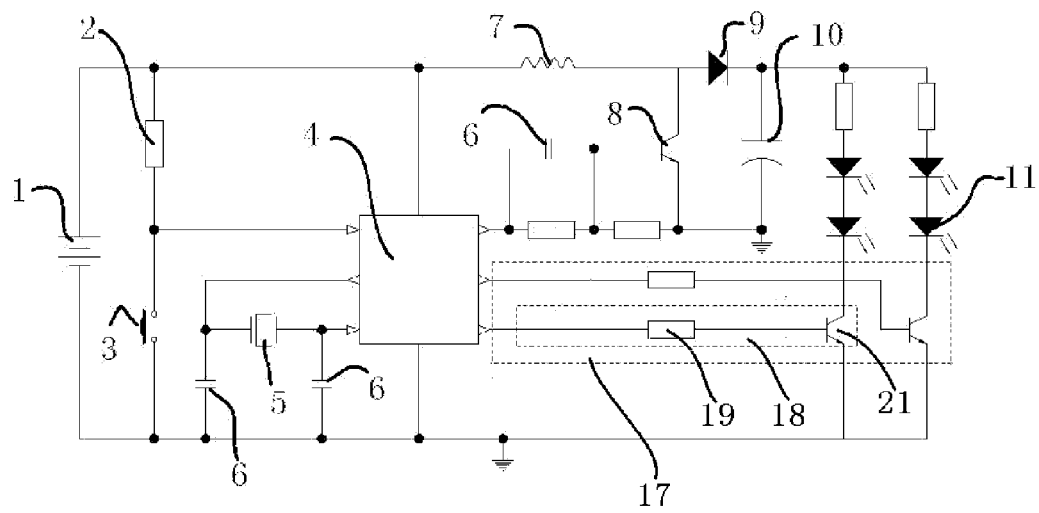
FIG. 5 is circuit diagram of LED decorative light of embodiment 2.

As shown in FIG. 5, the flashing control circuit 17 comprises a resistor 19 and a triode 21. The resistor is connected to the base of the triode, forming a base driver circuit 18. The resistor 19 is connected to I/O port of the main control chip and collector of the triode 21 is connected to LED light chains 11. The flashing control circuit 17 is provided with two base driver circuits 18, which enables 6-8 flashing functions of the LED light chains.

Figure 6:
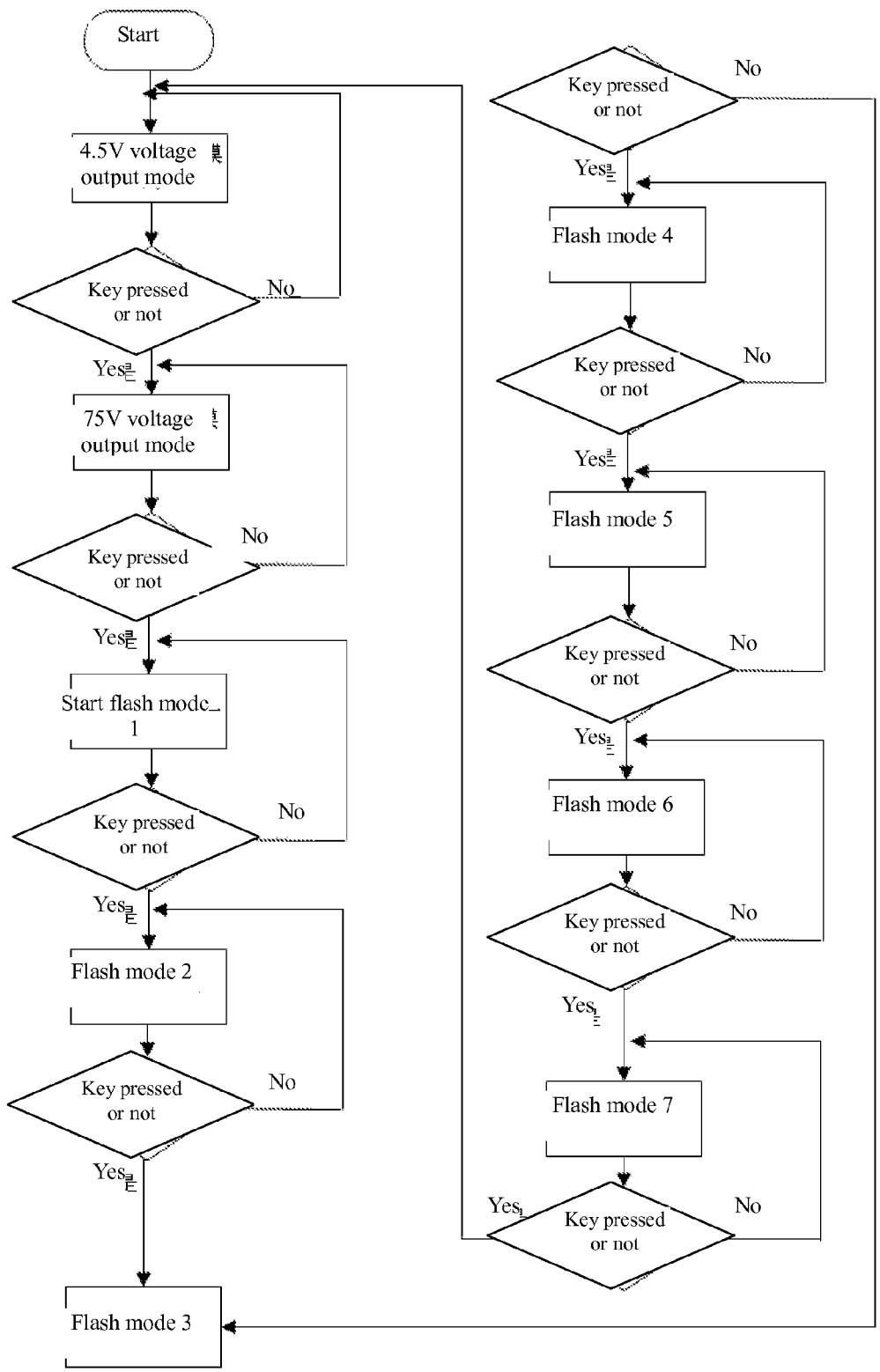
FIG. 6 is flashing control flow diagram of LED light chains of embodiment 2.

In this embodiment, the key switch 3 is also used to send input signal to the main control chip 4 for selecting flashing mode when the voltage adjustment circuit 12 is switched on. One LED flashing mode is realized each time the switch is pressed. As shown in FIG. 6, after the main control chip 4 is energized, the program resets and executes initialization procedure. When initialization is finished, the program actively switches to the main program to read status of the key switch and select different flashing modes based on the status of the key switch.

Embodiment 3

This is another embodiment of the main controller.

Figure 7:
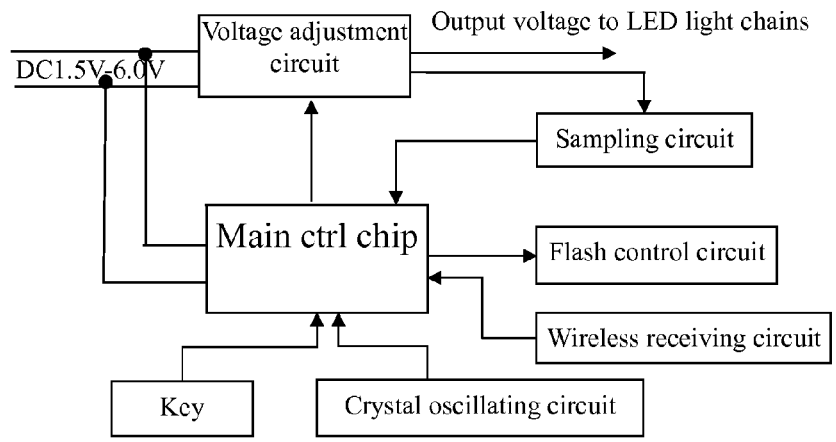
FIG. 7 is structural block diagram of main controller of embodiment 3.

As shown in FIG. 7, the main controller comprises DC power supply, main control chip, oscillating circuit, voltage adjustment circuit, LED light chains control circuit, sampling circuit, and wireless receiving circuit.

Figure 16:
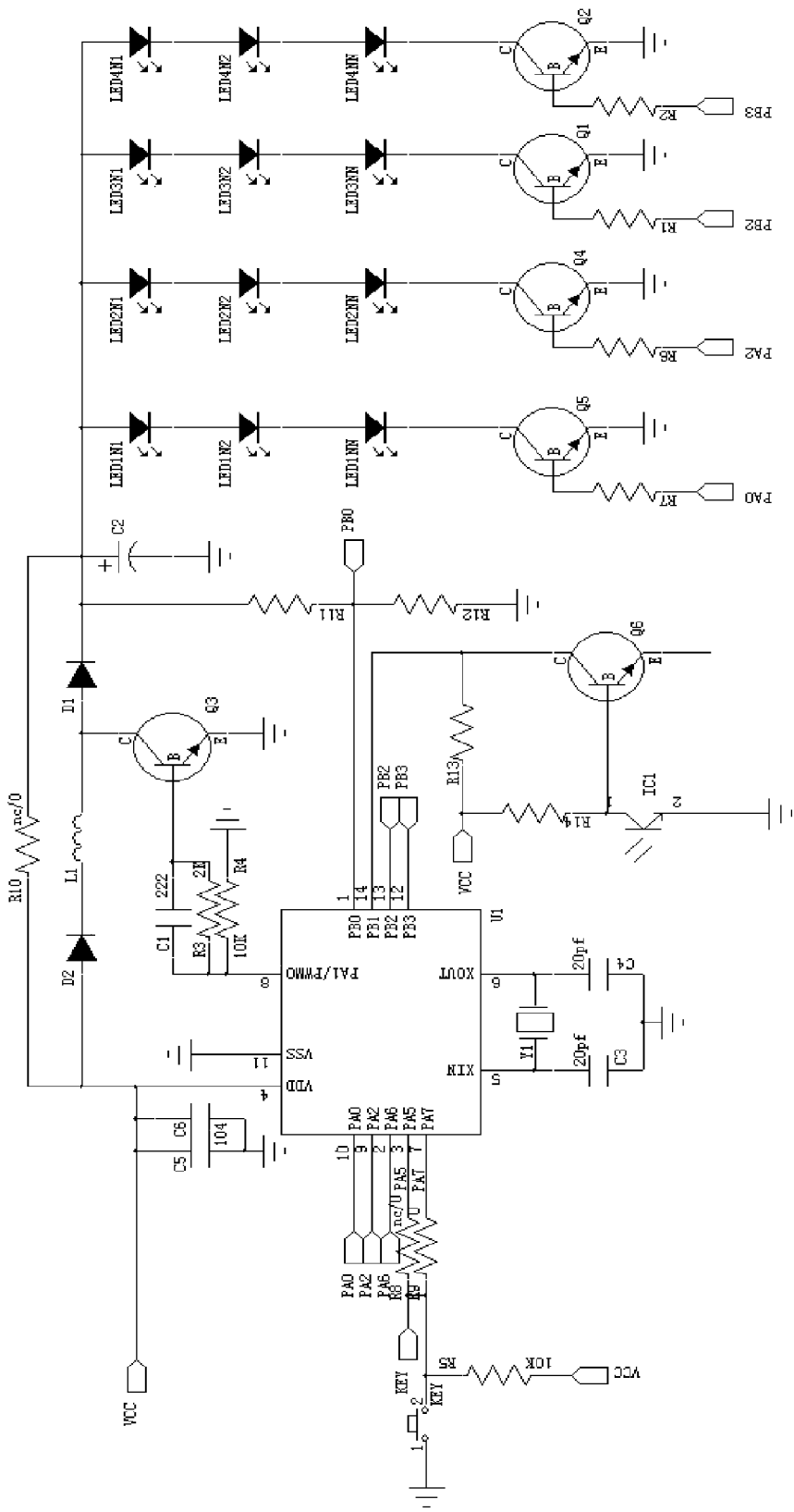
FIG. 16 is circuit diagram of LED decorative light of embodiment 3.

Of this preferred embodiment, the electric circuit adopted for the LED light chains is shown in FIG. 16. Circuit of each component is described below.

Figure 8:
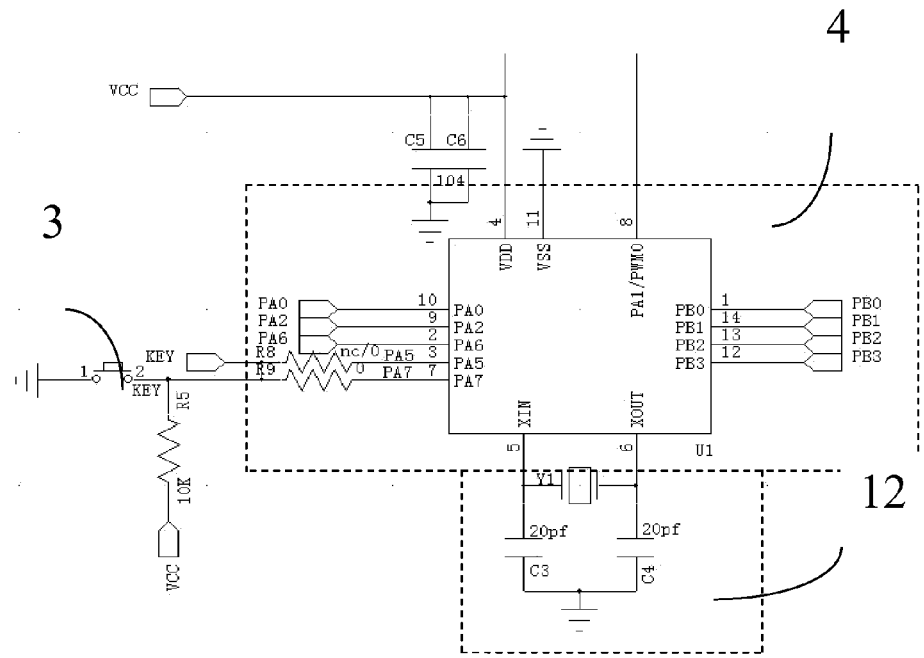
FIG. 8 is structural schematic diagram of main control chip of embodiment 3.

For the main control chip (SCM) shown in FIG. 8, power supply input end VCC is connected to one end of capacitor C5 and capacitor C6 (to SCM pin 4 VDD). The other end of capacitor C5 and capacitor C6 is connected to earth. SCM pin 7 is connected to one end of resistor R9. The other end of resistor R9 is connected to one end of KEY and one end of resistor R5. The other end of KEY is connected to earth and the other end of resistor R5 is connected to power supply input end VCC. SCM pin 5 XIN is connected to one end of crystal oscillator Y1 and capacitor C3. The other end of capacitor C3 is connected to earth. SCM pin 6 XOUT is connected to the other end of crystal oscillator Y1 and one end of capacitor C4. The other end of capacitor C3 and capacitor C4 is connected to earth. SCM pin 11 VSS is connected to earth.

After being filtered by capacitor C5 and capacitor C6, power supply input end VCC supplies power for the SCM. Capacitor C3, capacitor C4, and crystal oscillator Y1 form crystal oscillating circuit which provides operating frequency or timing for SCM.

Figure 9:
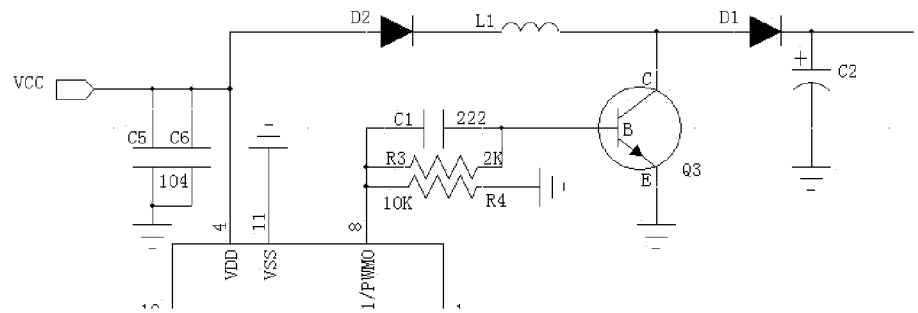
FIG. 9 is voltage adjustment circuit of embodiment 3.

In the voltage adjustment circuit shown in FIG. 9, power supply input end VCC is connected to one end of diode D2. The other end of diode D2 is connected to one end of inductor L1. The other end of inductor L1 is connected to pole C of triode Q3 and one end of diode D1. The other end of diode D1 is connected to one end of capacitor C2 and positive pole of LED light chains.

The other end of capacitor C2 is connected to earth. Pole E of triode Q3 is connected to earth. Base E of triode Q3 is connected to one end of capacitor C1 and one end of resistor R3. The other end of capacitor C1 is connected to the other end of resistor R3 and also connected to resistor R4. Connection end of capacitor C1 and resistor R3 is connected to pin 8 of SCM. The other end of resistor R4 is connected to earth.

SCM generates PWM pulse of certain duty ratio or continuously changing duty ratio at pin 8, so that inductor L1 is constantly charging and discharging. Each time inductor L1 discharges, magnetic energy is converted to electric energy, so that at inductor end, the left side is negative and the right side is positive. This voltage is superposed on power supply positive end, charging capacity C2 via diode D2, increasing voltage across capacitor C2. At the same time, diode D2 cuts off rise of inverse flow of voltage, thus increasing the voltage. Output voltage depends on duty ratio of PWM. This module can increase DC voltage of 1.5V~6V to 130V. Output voltage calculation formula is $V_{OUT}=V_{IN}/(1-D)$, where: Vout is output voltage and $V_{IN}$ is duty ratio of input voltage D.

Figure 10:
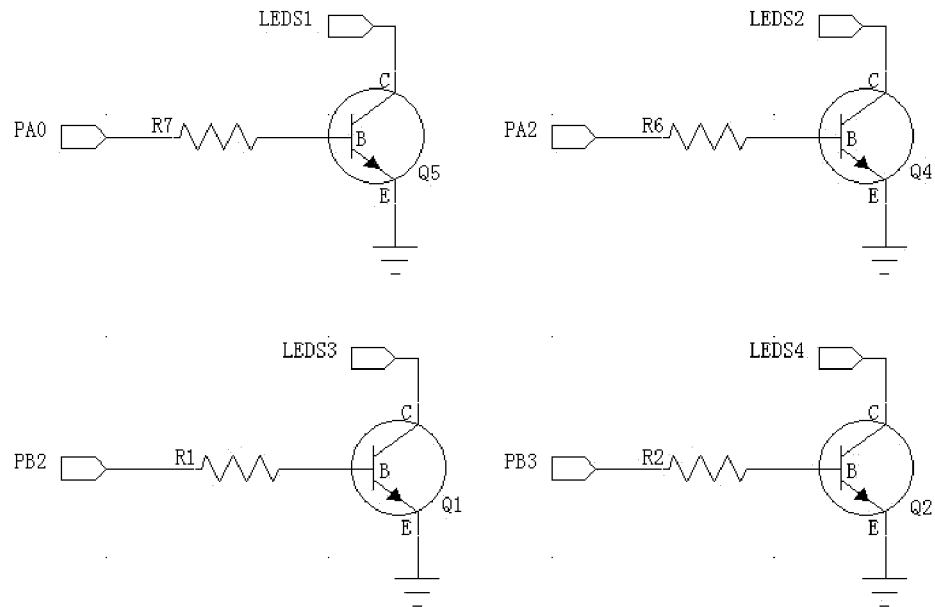
FIG. 10 is flashing control circuit of embodiment 3.

As shown in FIG. 10, LED light chains control circuit is used to control 4 lines of LED light chains. In this circuit:
a) SCM pin 10 port PA0 is connected to one end of resistor R7, the other end of resistor R7 is connected to pole B of triode Q5, pole E of triode Q5 is connected to earth, and pole C of the triode is connected to negative pole of LED light chains.
b) SCM pin 9 port PA2 is connected to one end of resistor R6, the other end of resistor R6 is connected to pole B of triode Q4, pole E of triode Q4 is connected to earth, and pole C of triode Q4 is connected to negative pole of LED light chains.
c) SCM pin 13 port PB2 is connected to one end of resistor R1, the other end of resistor R1 is connected to pole B of triode Q1, pole E of triode Q1 is connected to earth, and pole C of triode Q1 is connected to negative pole of LED light chains.
d) SCM pin 12 port PB3 is connected to one end of resistor R2, the other end of resistor R2 is connected to pole B of triode Q2, pole E of triode Q2 is connected to earth, and pole C of triode Q2 is connected to negative pole of LED light chains.

Figure 14:
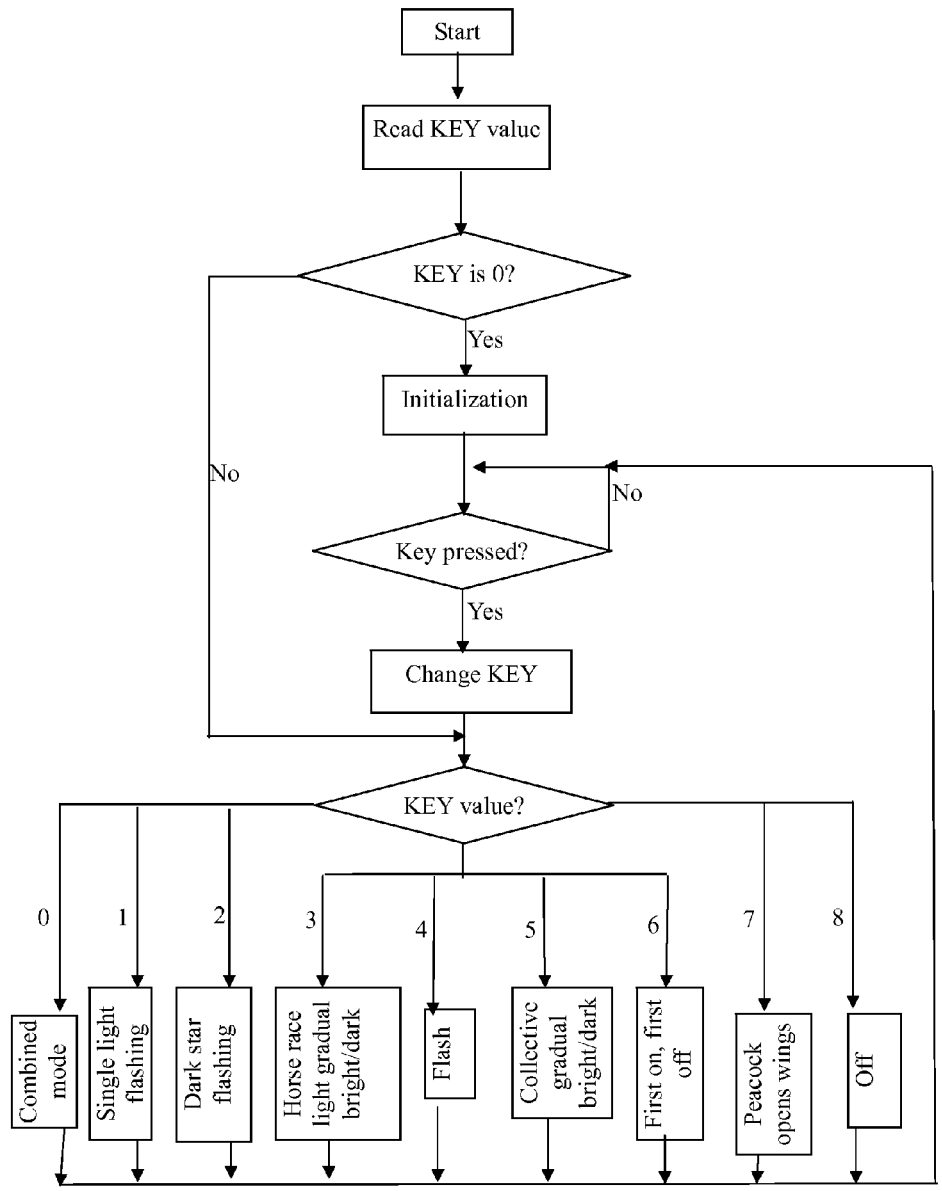
FIG. 14 is flashing control flow diagram of LED light chains of embodiment 3.

As shown in FIG. 14, after main control chip is energized, the program resets and executes initialization program. After execution of initialization, the program is actively switched to execution of main program, to read key switch status and select different flashing mode according to key switch status. The LED light chains control circuit controls 4 lines of LED light chains at the same time to realize the following LED flashing modes:
a) Single line flashing;
b) Dark star flashing;
c) Flashing;
d) Horse race light;

e) Peacock opening wings;
f) Collective gradual brightening and darkening;
g) Constant glowing;
h) Combinations of above.

In addition to above modes, various other flashing functions can also be realized as required. The main control chip (SCM) I/O port outputs high and low levels, and controls conducting and cutoff of corresponding triodes Q1, Q2, Q4, and Q5, so as to control lighting or not of corresponding LED light chains. The SCM controls change of PWM duty ratio and outputs voltage via the voltage adjustment circuit. When SCM controls slow increase of duty ratio, voltage applied on LED light chains will increase slowly, and the LED light chain will slowly brighten. When the duty ratio is decreased slowly, voltage applied on LED light chain will decrease slowly, and the LED light chain will slowly darken. With this method, voltage of LED light chains is changed to achieve the effect of gradual brightening and darkening. Therefore, as long as the SCM outputs pulse of changing duty ratio, different simple or complicated LED light chain flashing functions can be realized.

The following is an example that describes control of dark star flashing mode:

First, the SCM controls PWM port to output PWM of duty ratio changing from high to low, so that LED light chain voltage output by the voltage adjustment circuit also changes from high to low. When certain low voltage is reached, the SCM adjusts the duty ratio of PWM port output from low to high, so that the voltage adjustment circuit output voltage also changes from low to high. By repeating these steps, dark stars in the sky can be simulated. Then, the SCM controls conducting and cutoff of triode Q5 corresponding to the LED light chain (refer to FIG. 6-1) to realize flashing of dark stars.

Figure 11:
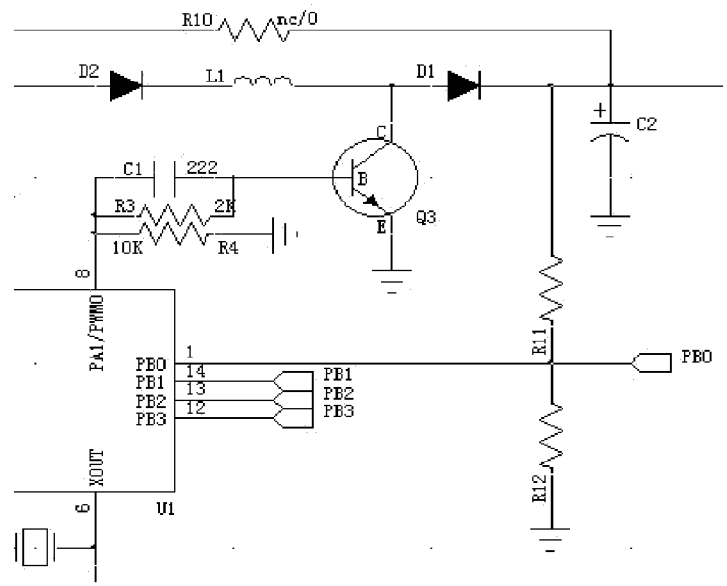
FIG. 11 is sampling circuit of embodiment 3.

As shown in FIG. 11, resistors R11 and R12 constitute a sampling circuit. One end of resistor R11 is connected to the connection end of diode D1 and capacitor C2. The other end of resistor R11 is connected to SCM pin 1 port PB0 and one end of resistor R12. The other end of resistor R12 is connected to earth. The SCM samples this voltage in real-time via one pin (port PB0). When sampled voltage is high, this indicates that the LED light chain is in normal range of brightness. When sampled voltage is low, this indicates that the LED light chain is dark, and output voltage needs to be increased. In this case, the main control chip will adjust duty ratio of PWM, to increase voltage outputted by LED light chain control circuit, so that original viewing effect of LED light chains is maintained. This makes full use of battery voltage, avoids frequency battery replacement, and realizes energy saving and environmental protection.

Figure 12:
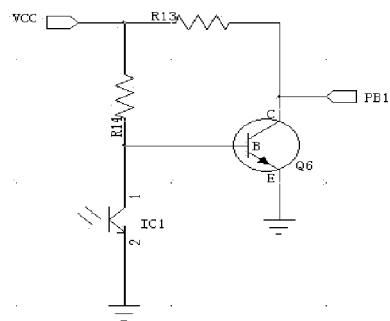
FIG. 12 is wireless receiving circuit of embodiment 3.

In the wireless receiving circuit shown in FIG. 12, one pin of wireless receiving tube IC1 is connected to resistor R14 and pole B of triode Q6. The other pin of resistor R14 is connected to power supply input end VCC. Pole E of triode Q6 is connected to earth. Pole C of this triode is connected to SCM port PB1 and one end of resistor R13. The other end of resistor R13 is connected to power supply input end VCC.

When wireless receiving tube IC1 receives a wireless signal, IC1 will control conducting or cutoff of triode Q6 according to this signal. In this way, pole C of triode Q6 will generate corresponding coded information, which is obtained by the SCM via port PB1. The SCM will then control lighting or not of LED light chains according to such coded information.

Figure 13:
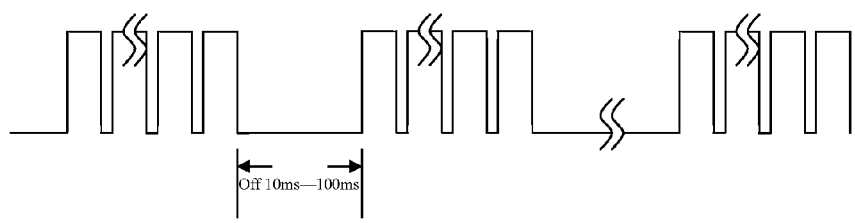
FIG. 13 is the pulse outputted by main control chip pulse width modulation output end of embodiment 3.

As shown in FIG. 13, main control chip pulse width modulation output end PMW0 outputs pulse of 0 duty ratio and duty ratio pulse that lights up LED light chains, at an interval in 10-100 ms, which is less than visual persistence time of LED light in the human eyes. On/Off control at an interval and the energy saving control of preferred embodiment 2 are executed at the same time to achieve the goal of further energy saving.

What is claimed is:

1. An LED decorative light comprising:
a DC power supply, a main controller, and a plurality of LED light chains, said main controller including a key switch, a crystal oscillating access circuit, and a main control chip, wherein said key switch and said crystal oscillating access circuit is connected to said main control chip respectively;
wherein a pulse width modulation end of said main control chip outputs a variable duty ratio PWM, said crystal oscillating access circuit used to provide an instruction cycle required for said main control chip;
wherein said key switch is used to control an operating state of said main control chip;
wherein said main controller also includes a voltage adjustment circuit, used to adjust the DC power supply voltage to a value required for the plurality of LED light chains, with an input end of the voltage adjustment circuit connected to said DC power supply, a control end connected to the pulse width modulation end of said main control chip, and an output end connected to a LED light chain input end;
wherein said key switch has a point contact type structure and a conductive silicon rubber layer provided on an internal end face, further wherein the key switch is used for controlling the main control chip to switch on and off the voltage adjustment circuit;
wherein said key switch is also used to send an input signal to the main control chip for selecting a flashing mode when the voltage adjustment circuit is switched on.

2. The LED light fixture of claim 1, wherein said main controller is also provided with a flashing control circuit having an input end connected to an I/O port of the main control chip and the output end of the plurality of LED light chains, further wherein said main control chip drives the plurality of LED light chains to flash via the flashing control circuit.

3. The LED light fixture of claim 1, wherein said crystal oscillating access circuit comprises at least two ceramic disc capacitors connected in parallel and a crystal oscillator connected with the at least two capacitors.

4. The LED light fixture of claim 1, wherein said voltage adjustment circuit comprises an inductor, a ceramic disc capacitor, a carbon film resistor, a triode, a diode, and an electrolytic capacitor that are electrically connected.

5. The LED light fixture of claim 1, wherein said main control chip is also used to make the pulse width modulation end to output pulse of 0 duty ratio and duty ratio pulse that lights up LED light chains at an interval less than a visual persistence time of LED light in human eyes.

6. The LED light fixture of claim 1, wherein said main control chip has a built-in timer and frequency divider, further wherein said crystal oscillating access circuit sets a timer overflow time and an energy saving module of said main control chip controls the LED light fixture to shut off automatically after 6-hour service every day and to start working again automatically after 18 hours of outage.

7. The LED light fixture of claim 1, wherein said main controller is provided with a sampling circuit, said sampling circuit connected to the plurality of LED light chains control circuit output end and said main control chip samples output voltage of the sampling circuit via the JO port in real-time, and when a sampled voltage is lower than a set output value, the main control chip adjusts the duty ratio of PWM to increase the output voltage of the control circuit of the plurality of LED light chains.

8. The LED light fixture of claim 1, wherein said main controller is also provided with a wireless receiving circuit connected to the main control chip and used to receive wireless signals from a wireless transmitter, the wireless signal then being sent to the main control chip.

9. The LED light fixture of claim 2, wherein said flashing control circuit comprises a resistor and a triode, the resistor connected to a base of the triode, forming a base driver circuit, wherein said resistor is connected to an I/O port of the main control chip and a collector of the triode is connected to the plurality of LED light chains.

* * * * *